United States Patent [19]

Saito et al.

[11] Patent Number: 4,715,677

[45] Date of Patent: Dec. 29, 1987

[54] RUGGEDIZED OPTICAL FIBER CABLE

[75] Inventors: Yasunori Saito, Cary; John DeAngeles, Durham, both of N.C.

[73] Assignee: Sumitomo Electric Research Triangle, Inc., Research Triangle Park, N.C.

[21] Appl. No.: 812,973

[22] Filed: Dec. 24, 1985

[51] Int. Cl.[4] .............................................. G02B 6/44
[52] U.S. Cl. ................................... 350/96.23; 174/41; 350/96.10
[58] Field of Search ..................................... 350/96.23

[56] References Cited

U.S. PATENT DOCUMENTS

| T900,002 | 7/1972 | Weilar, II | 350/96.23 |
|---|---|---|---|
| 3,694,285 | 9/1972 | Appel et al. | 350/96.23 |
| 3,718,515 | 2/1973 | Goldstein | 156/174 |
| 3,887,265 | 6/1975 | Margolis et al. | 350/96.23 |
| 3,984,172 | 10/1975 | Miller | 350/96.23 |
| 4,070,093 | 1/1978 | Schwartz | 350/96.23 |
| 4,078,853 | 3/1978 | Kempf et al. | 350/96.23 |
| 4,113,349 | 9/1978 | Stiles | 350/96.23 |
| 4,176,910 | 12/1979 | Noethe | 350/96.23 |
| 4,195,906 | 4/1980 | Dean et al. | 350/96.23 |
| 4,199,225 | 4/1980 | Slaughter et al. | 350/96.23 |
| 4,241,979 | 12/1980 | Gagen et al. | 350/96.23 |
| 4,283,716 | 8/1981 | Pasquali | 340/380 |
| 4,355,865 | 10/1982 | Conrad et al. | 350/96.23 |
| 4,365,865 | 12/1982 | Stiles | 350/96.23 |
| 4,389,087 | 6/1983 | Bendayan et al. | 350/96.23 |
| 4,390,238 | 6/1983 | Van Der Hoek | 350/96.23 |
| 4,401,361 | 8/1983 | Slaughter | 350/96.23 |
| 4,420,220 | 12/1983 | Dean et al. | 350/96.23 |
| 4,534,618 | 8/1985 | Bruggendieck | 350/96.23 |
| 4,630,887 | 12/1986 | Taylor | 350/96.23 |

Primary Examiner—William L. Sikes
Assistant Examiner—Akm E. Ullah
Attorney, Agent, or Firm—Richard E. Jenkins

[57] ABSTRACT

There is provided a flat optical fiber cable comprised of a plurality of plastic coated optical fibers arranged parallel to one another and enveloped within a fiber-reinforced plastic jacket and possessing enhanced mechanical strength and thermal stability. A plurality of the flat optical fiber cables may be stacked together and surrounded by a plastic sheath which does not require additional strength members in view of the inherent strength of the flat cables contained therein.

22 Claims, 13 Drawing Figures

RUGGEDIZED OPTICAL FIBER CABLE

TECHNICAL FIELD

The invention relates generally to optical fiber cable and more particularly to an improved ruggedized flat cable construction. The ruggedized construction allows for a greater variety of cable applications by providing for enhanced mechanical strength as well as impact and compression resistance. Whereas optical flat cables have heretofore primarily been used as indoor cable, the cable of the present invention may be utilized for long haul, trunk and carrier applications.

BACKGROUND ART

Electrical flat cables are known and used in a variety of applications and configurations. Representative of the prior art flat cables are those disclosed in U.S. Pat. No. 4,113,349 to Stiles and U.S. Pat. No. 4,176,910 to Noethe. Noethe teaches a flat optical fiber cable comprised of a plurality of optical fibers enveloped within a soft cast synthetic resin which is chemically cured at a relatively low temperature. Of perhaps greater interest, U.S. Pat. No. 4,113,349 to Stiles discloses an optical fiber cable comprising one or more core optical fibers each having a cured silicone rubber coating and an outer fiber-reinforced set resin shell surrounding the core of one or more rubber coated optical fibers.

Although flat optical fiber cables of various constructions and configurations are known, it is believed that this particular type of cable generally suffers from a deficiency in mechanical strength which results in limitations to its application. Particularly, it is believed that flat optical fiber cables as presently known are primarily limited to indoor applications and not necessarily suitable to survive the rigors of outdoor cable installation in duct, buried and aerial environments.

DISCLOSURE OF THE INVENTION

According to the present invention, there is provided a ruggedized flat optical fiber cable possessing enhanced strength so as to be capable of utilization in a wide variety of applications.

The ruggedized optical fiber cable of this invention utilizes at least one plastic coating on each optical fiber contained within the flat cable which provides enhanced mechanical strength in combination with the fiber reinforced plastic resin outer jacket. The enhanced mechanical strength and optical temperature dependence performance of the flat cable allows for installation of the cable in outdoor duct, buried or aerial applications which were not heretofore practical for this type of flat cable. A second embodiment of the invention contemplates positioning a stack of the flat cables within a round cable sheath which sheath does not require reinforcement elements in view of the enhanced mechanical strength of the flat cables contained therein.

More specifically, the improved optical fiber cable construction of the invention contemplates a primary coating of a plastic such as silicone or acrylic resin directly over the cladding of each optical fiber, and additional plastic coatings may be used as desired. The coated optical fibers of the flat cable may also be disposed within a plurality of tight or loose buffer tubes constructed of a plastic such as nylon, polyester, polyethelene or the like. If buffer tubes are provided for the flat cable of the invention it is further contemplated that the space between the optical fibers and the inner tube wall may be filled with a jelly-like material such as silicone or paraffine oil with fumed silica or other type additives in order to provide environmental protection to the optical fibers.

By utilizing the improved flat optical fiber cable described herein, either alone or in a stacked configuration within a tubular sheath, flat cables may be used in outdoor applications previously not practical in view of the high mechanical strength requirements. The ruggedized fiber optical cable of the present invention raises the level of mechanical strength substantially so as to enable the cable to withstand tensile forces required in outdoor installation into ducts as well as buried and aerial cable environments. Additionally, the plastic coated optical fibers surrounded by a fiber-reinforced plastic jacket possess excellent thermal stability over a wide temperature range.

Therefore, it is an important object of the present invention to provide a ruggedized flat optical fiber cable possessing enhanced mechanical strength and improved temperature dependence performance.

More specifically, an object of the present invention is to provide a flat optical fiber cable which can be utilized in outdoor applications not heretofore feasible.

Still a further object of the present invention is to provide a flat optical fiber cable which possesses sufficient inherent mechanical strength to be utilized in a tubular non-reinforced plastic sheath.

BRIEF DESCRIPTION OF THE DRAWINGS

The present invention will now be described in detail with reference to the accompanying drawings in which.

BEST MODE FOR CARRYING OUT THE INVENTION

According to the present invention, there is provided a unique flat optical fiber cable of enhanced mechanical strength so as to allow for certain outdoor applications.

As used in the specification and claims, the term "optical fiber" means an optical guide utilized for light transmission which may either be multimode or monomode and which may utilize any core to cladding ratio or numerical aperture.

Figure 1A:
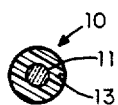
FIG. 1A is a cross-sectional view of a coated optical fiber to be incorporated into the flat cable of the present invention.
Figure 1B:
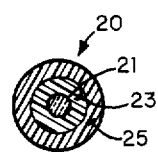
FIG. 1B is a cross-sectional view of a variation of the coated optical fiber to be incorporated into the flat cable of the present invention.
Figure 1C:
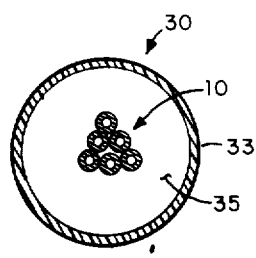
FIG. 1C is a cross-sectional view of a buffer tube and coated optical fibers therein for incorporation into the flat cable of the present invention.

With reference to FIG. 1A, coated optical fiber 10 comprises an optical fiber 11 surrounded by a plastic coating 13, such as silicone or acrylic resin, to provide mechanical and environmental protection to optical fiber 11. FIG. 1B depicts coated fiber 20 comprising an optical fiber 21 surrounded by a first plastic coating 23 similar to coating 13 of FIG. 1A and a second plastic coating 25, preferably of nylon, polyester or the like, to provide additional mechanical strength. FIG. 1C depicts buffer tube 30 comprising a plurality of coated fibers 10 loosely fitted in plastic tube 33 which may most suitably be filled with a jelly-like material 35. It should be appreciated that although FIGS. 2A-2G and FIGS. 3A-3B depict two embodiments of the present invention utilizing coated optical fiber 10 of FIG. 1A, coated optical fiber 20 or buffer tube 30 may be substituted therefor as a matter of choice. More specifically, it is contemplated that although coated fiber 10 has been depicted in FIGS. 2A-2G and FIGS. 3A-3B for ease of illustration, the present invention clearly contemplates substitution of either coated optical fiber 20 or buffer tube 30 for coated optical fiber 10.

Figure 2A:
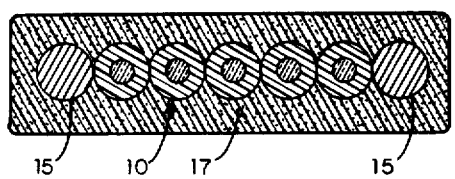
FIGS. 2A-2G are cross-sectional views of several variations possible in the construction of the flat cable of the present invention.

FIGS. 2A-2G illustrate a number of variations of a first embodiment of the present invention. FIG. 2A shows a cross-section of the ruggedized flat optical cable of the invention in which coated optical fibers 10 are positioned in parallel alignment without any separation therebetween. Optional strength members 15 are shown positioned on opposing sides of coated optical fibers 10 and may be constructed of either a metallic or non-metallic material. Coated optical fibers 10 and strength members 15 are encapsulated with a fiber-reinforced plastic jacket 17. This particular flat cable provides for employing a higher fiber density without degrading mechanical strength of the flat cable.

Figure 2B:
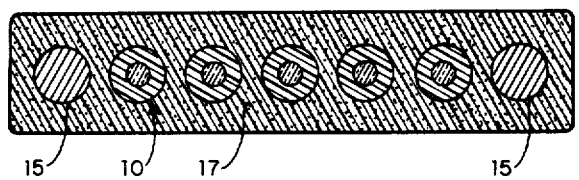

FIG. 2B illustrates a flat cable wherein coated optical fibers 10 are spaced apart so as to allow fiber-reinforced plastic 17 to fill all of the intersticies around coated optical fibers 10 and optional strength members 15. This particular configuration provides a high level of mechanical strength due to the additional fiber reinforced plastic 17 contained around the fibers while still allowing for a relatively small thickness flat cable.

Figure 2C:
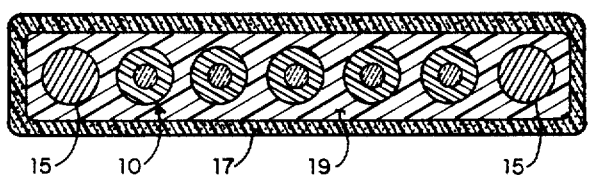

Another variation of the flat cable of the present invention is shown in FIG. 2C wherein coated optical fibers 10 and optional strength members 15 have a thin layer of plastic 19 extruded thereover which serves to hold the fibers together so as to minimize manufacturing difficulties and to serve as a cushion for improved mechanical performance. Cushioning plastic 19 may be a solid or foam-type material such as polyethelene. The fiber-reinforced plastic jacket 17 envelopes cushioning plastic 19.

Figure 2D:
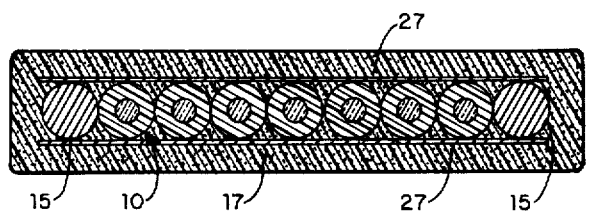

FIG. 2D shows a cross-section of the flat cable of the instant invention wherein coated optical fibers 10 are laminated into a flat package which may include optional strength members 15. A tape 27, which is most preferably of polyester or similar type tape, is applied to the top and bottom surface of the parallel array of coated optical fibers 10 with an adhesive in order to hold the fibers in position. The laminated structure is relatively easy to handle and minimizes manufacturing problems during application of fiber-reinforced plastic jacket 17 thereto. Also, tape 27 positioned over and under coated optical fibers 10 acts as a cushion to improve impact and compression strength of the flat cable.

Figure 2E:
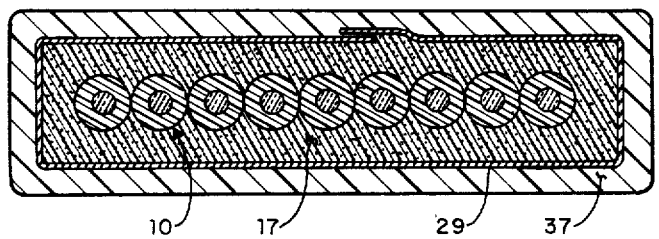

Still another variation of the first embodiment of the present invention is shown in FIG. 2E wherein a sheath 29, preferably constructed of steel, is applied over fiber-reinforced plastic jacket 17 in a longitudinally folded configuration and additional plastic jacket 37 extruded thereover. Plastic jacket 37 may be any type of plastic such as polyethelene or PVC and preferably has a thickness of about 1.0 mm. This flat cable is intended for employment in extreme conditions.

Figure 2F:
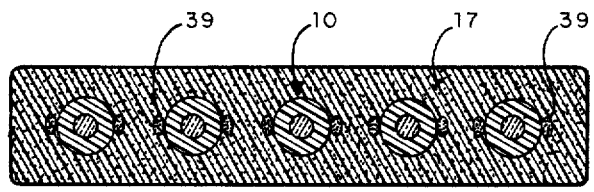
Figure 2G:
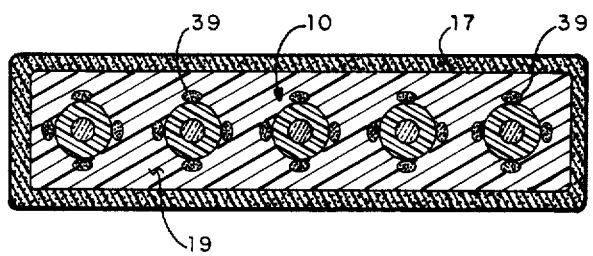

FIGS. 2F and 2G disclose the final depicted variations of the flat cable of the instant invention. Fibrous material 39, most suitably a continuous multifilament KEVLAR or the like, serves as a cushioning material adjacent coated optical fibers 10 and provides additional flexibility to the flat cable by allowing the fibers to flex when bending of the cable occurs and thereby minimizes any micro-bending effect. Fibrous yarns 39 may also act as tension elements. FIG. 2F depicts fibrous yarn 39 located in the same plane as coated optical fibers 10 whereas FIG. 2G depicts fibrous yarn 39 also provided over and under coated optical fibers 10 for still greater flexing protection for the coated optical fibers 10. Fibrous yarns 39 may completely encircle coated optical fibers 10. FIG. 2G also includes cushioning plastic layer 19 surrounding fibers 10 and yarns 39.

Figure 4:
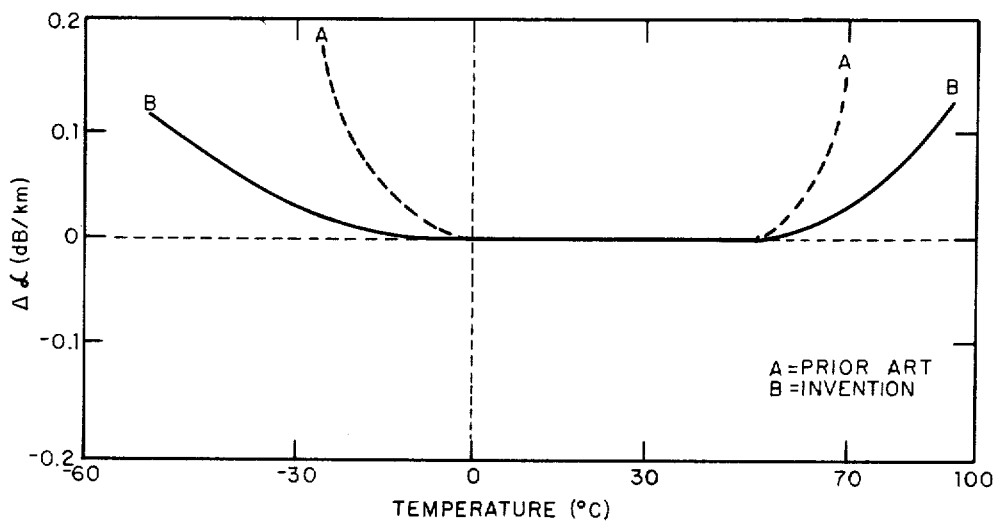
FIG. 4 is a representative chart of temperature related performance of the flat cable of the present invention in comparison to prior art flat cables.

The flat cable as described hereinabove possesses greater compression, impact and tensile strength than known prior art flat type optical fiber cables. Also, improved thermal stability results since the thermal expansion coefficient of coated optical fiber 10 and the fiber-reinforced plastic jacket 17 are similar. This results in a more favorable temperature versus attenuation curve than prior art flat cables (see FIG. 4). Most suitably, coated optical fibers 10 are about 0.25 to 0.9 mm in diameter and plastic jacket 17 is about 5 mm in thickness. Fiber reinforced plastic jacket 17 contains a plurality of monofilament yarns therein extending generally parallel to optical fibers 10 and selected from the group comprising glass, KEVLAR, carbon and graphite yarns.

Figure 3A:
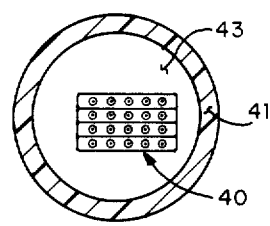
FIGS. 3A-3B are cross-sectional views of two variants of a second embodiment of the present invention wherein a stack of the flat cables is positioned within a non-reinforced plastic sheath.
Figure 3B:
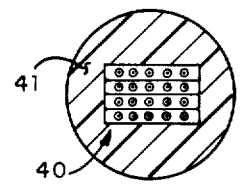

A second embodiment of the present invention is depicted in FIGS. 3A-3B of the drawings. FIG. 3A shows a stack of flat optical fiber cables 40 constructed according to the invention and positioned within tubular plastic sheath 41. The intersticies between the stack of flat cables 40 and the inner wall of plastic sheath 41 may be filled with a water blocking jelly 43. FIG. 3B illustrates a variation of the second embodiment of the present invention wherein plastic sheath 41 is extruded in intimate contact with stacked flat optical fiber cables 40. This eliminates the need for jelly 43 or any other type of cable filling. The stacked flat cables may be sheathed either with a constant pitch, varying pitch or zero pitch. In view of the enhanced mechanical strength of the flat cables within plastic sheath 41, previously required steel wire reinforcement elements and the like are not required in plastic sheath 41 and a smaller diameter package may be manufactured with satisfactory mechanical strength derived from the individual flat optical fiber cables positioned within plastic sheath 41.

While the instant invention has been shown and described herein in what is conceived to be the most practical and preferred embodiment, it is recognized that departures may be made therefrom within the scope of the invention which is therefore not to be limited to the details disclosed herein but is to be accorded the full scope of the claims so as to embrace any and all equivalent apparatus or articles.

What is claimed is:

1. A high strength flat optical fiber cable comprising:
  a plurality of plastic coated optical fibers in parallel relationship; and
  an outer jacket surrounding said plurality of optical fibers, said outer jacket comprising a set resin having a plurality of fiber reinforcement elements positioned thoughout the set resin and extending generally parallel to said optical fibers with a high strength fiber reinforced resin jacket wherein said fiber reinforcement elements comprise a plurality of monofilament yarns selected from the group comprising glass, KEVLER, carbon and graphite yarns.

2. An optical fiber cablae according to claim 1 including an elongate strength member on each side of said plurality of optical fibers and extending generally parallel therewith.

3. An optical fiber cable according to claim 2 wherein said strength member is metallic.

4. An optical fiber cable according to claim 2 wherein said strength member is non-metallic.

5. An optical fiber cable according to claim 1 wherein said outer jacket is about 0.5 mm in thickness.

6. An optical fiber cable according to claim 1 including a laminate material adhesively secured above and a laminate material adhesively secured below said plurality of optical fibers and surrounded by said outer jacket.

7. An optical fiber cable according to claim 10 wherein said laminate material is a polyester tape.

8. An optical fiber cable according to claim 1 wherein said optical fibers are loosely positioned in a plurality of plastic buffer tubes arranged parallel to one another.

9. An optical fiber cable according to claim 8 including a plastic coating immediately surrounding said plurality of buffer tubes.

10. An optical fiber cable according to claim 8 wherein said buffer tubes each contain about 12 of said optical fibers.

11. An optical fiber cable according to claim 10 wherein said cable comprises about 4 of said buffer tubes.

12. An optical fiber cable according to claim 8 including a soft jelly-like cushioning material within each of said buffer tubes.

13. An optical fiber cable according to claim 1 including a plastic jacket surrounding said outer fiber reinforced resin jacket.

14. An optical fiber cable according to claim 13 including a steel reinforcement sheath between said outer fiber reinforced resin jacket and said plastic jacket.

15. An optical fiber cable according to claim 1 including a plurality of cushioning yarns adjacent said optical fibers.

16. A tubular high strength fiber optical cable comprising:
    a plurality of flat optical fiber cables in stacked relationship, said flat cables each comprising a plurality of plastic coated optical fibers in parallel relationship surrounded by a jacket of fiber reinforced resin having a plurality of fiber reinforcement elements positioned throughout the resin so as to surround said plurality of optical fiobers with a high strengtrh fiber reinforced resin jacket wherein said fiber reinforcement elements comprise a plurality of monofilament yarns selected from the group comprising glass, KEVLER, carbon and graphite yarns; and
    a non-reinforced plastic sheath member surrounding said flat cables.

17. An optical fiber cable according to claim 16 wherein said flat cables are stacked without any pitch.

18. An optical fiber cable according to claim 16 wherein said flat cables are stacked with a predetermined constant pitch.

19. An optical fiber cable according to claim 16 wherein said flat cables are stacked with a predetermined varying pitch.

20. An optical fiber cable according to claim 16 wherein the interstices between said stacked flat cables and said plastic sheath members are filled with a water blocking material.

21. An optical fiber cable according to claim 16 wherein said stacked flat cables are in intimate contact with said plastic sheath member.

22. An optical fiber cable according to claim 16 wherein said plurality of optical fibers are loosely positioned in a plurality of plastic buffer tubes arranged parallel to one another within each of said flat optical fiber cables.

* * * * *

UNITED STATES PATENT AND TRADEMARK OFFICE
CERTIFICATE OF CORRECTION

PATENT NO. : 4,715,677
DATED : December 29, 1987
INVENTOR(S) : Saito, et al.

It is certified that error appears in the above-identified patent and that said Letters Patent is hereby corrected as shown below:

Claim 1, line 8, after "fibers", insert --so as to surround said plurality of optical fibers--.

Claim 2, line 1, "cablae" should read --cable--.

Claim 7, line 1, "10" should read --6--.

Claim 16, line 9, "fiobers" should read --fibers--.

Claim 16, line 10, "strengtrh" should read --strength--.

Signed and Sealed this

Twenty-eighth Day of June, 1988

Attest:

DONALD J. QUIGG

*Attesting Officer*　　　　　*Commissioner of Patents and Trademarks*